United States Patent
Schweiger et al.

(10) Patent No.: US 6,580,354 B1
(45) Date of Patent: Jun. 17, 2003

(54) CONTROL SYSTEM AND METHOD FOR CONTROLLING MOTOR VEHICLE FUNCTIONS

(75) Inventors: Juergen Schweiger, Pentling (DE); Reiner Buchner, Sinzing (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/525,859

(22) Filed: Mar. 14, 2000

(30) Foreign Application Priority Data

Mar. 15, 1999 (DE) .......................................... 199 11 459

(51) Int. Cl.[7] .............................................. G05B 19/00
(52) U.S. Cl. ...................... 340/5.62; 340/5.1; 340/5.2; 340/426; 340/425.5; 340/825.69; 340/825.72; 180/287; 307/10.2
(58) Field of Search ................................. 340/5.62, 5.1, 340/5.2, 426, 425.5, 539, 825.69, 825.72; 307/10.2; 180/287

(56) References Cited

U.S. PATENT DOCUMENTS

| 4,638,294 A | * | 1/1987 | Sakurai ...................... 340/426 |
| 5,396,217 A | * | 3/1995 | Proefke et al. ............. 340/426 |
| 6,100,603 A | * | 8/2000 | Gold .......................... 307/10.2 |
| 6,211,776 B1 | * | 4/2001 | Röhrl et al. ................ 340/426 |

FOREIGN PATENT DOCUMENTS

| DE | 43 00 600 A1 | 7/1994 |
| DE | 43 29 697 C2 | 3/1995 |
| DE | 197 11 901 C1 | 8/1998 |

* cited by examiner

Primary Examiner—Michael Horabik
Assistant Examiner—Yves Dalencourt

(57) ABSTRACT

A system and method for controlling functions of a vehicle includes first and second electromagnetic communication devices. The first electromagnetic communication device is adapted to transmit a coded response signal. The second electromagnetic communication device is adapted to receive the coded response signal. The second electromagnetic communication device is further adapted to transmit an uncoded outgoing signal and to receive an uncoded incoming signal that is a reflection of the outgoing signal.

20 Claims, 1 Drawing Sheet

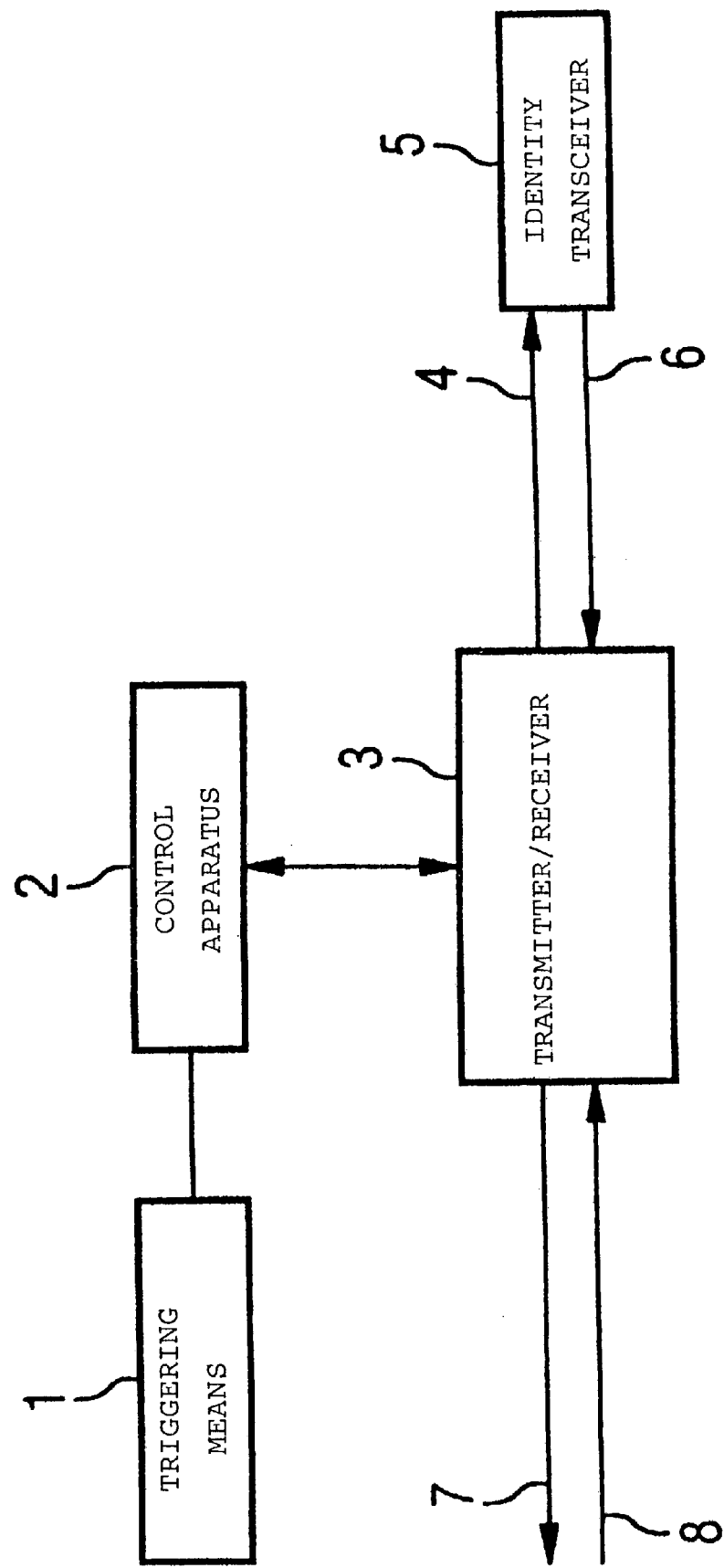

CONTROL SYSTEM AND METHOD FOR CONTROLLING MOTOR VEHICLE FUNCTIONS

CROSS REFERENCE TO RELATED APPLICATIONS

This application claims reference to German Application No. 19911459.5, filed on Mar. 15, 1999, which is incorporated by reference herein in its entirety

BACKGROUND OF THE INVENTION

The present invention relates to a control system, and more particularly a system including a plurality of communicating devices for controlling different motor vehicle functions.

German Patent No. 43 29 697 C2 discloses a motor vehicle control system for operating an access control device in which, when a triggering means, such as a door handle, is operated, transmits an inquiry signal to the identity transmitter and examines the response signal received from the latter for correctness. For this purpose a transmitting and receiving system with transmitter and receiver is provided on the vehicle and is controlled and evaluated by a control apparatus.

German Patent No. 197 11 901 C1 discloses another conventional automobile control system in which one or more security systems, such as a central lock or vehicle immobilizer, are locked or unlocked when the identity transmitter proves to be authorized.

German Patent No. 43 00 600 A1 discloses another conventional automobile control system both a security system and motor vehicle functions are remotely control. For this purpose a coded radio signal for the security system is emitted, the correctness of which is checked. For the motor vehicle functions, such as "close windows," an additional infrared signal is emitted. This infrared signal can be coded or uncoded.

These conventional systems suffer from a number of disadvantages, including that it is expensive to control a plurality of motor vehicle functions.

SUMMARY OF THE INVENTION

The present invention provides a system for controlling plural functions of a vehicle. The system comprises an electromagnetic transceiver adapted to be fixed with respect to the vehicle, and a controller operatively interconnected with the electromagnetic transceiver. The electromagnetic transceiver receives a coded response signal, transmits an uncoded outgoing signal, and receives an uncoded incoming signal that is a reflection of the uncoded outgoing signal. The controller verifies the coded response signal to authorize a first vehicle function and evaluates the uncoded incoming signal in connection with a second vehicle function.

The present invention also provides a system for controlling functions of a vehicle. The system comprises first and second electromagnetic communication devices. The first electromagnetic communication device transmits a response signal. The second electromagnetic communication device receives the response signal, transmits an outgoing signal, and receives an incoming signal that is a reflection of the outgoing signal.

The present invention further provides a method for controlling functions of a vehicle. The method comprises receiving a coded response signal, verifying the coded response signal to authorize a first vehicle function, transmitting an uncoded outgoing signal, receiving an uncoded incoming signal that is a reflection of the uncoded outgoing signal; and evaluating the uncoded incoming signal in connection with a second vehicle function.

BRIEF DESCRIPTION OF THE DRAWING

The accompanying drawing, which is incorporated herein and constitutes part of this specification, illustrates presently preferred embodiments of the invention, and, together with the general description given above and the detailed description given below, serves to explain features of the present invention.

The drawing FIGURE is a block diagram of a control system according to the present invention.

DETAILED DESCRIPTION OF THE PREFERRED EMBODIMENTS

According to the present invention at least two different motor vehicle functions are controlled, one of which is executed only in the presence of a correct identity transmitter and the other is executed without checking the identity transmitter. An interior surveillance monitor or a parking aid (forward facing or backward facing) are examples of functions which are operated without checking for the presence of an identity transmitter.

Performing plural functions with the same transmitter/receiver provides some advantages in comparison with the otherwise necessary usual offering of separate transmitting/receiving systems. These advantages include requiring less space in the vehicle, weighing less, a less complicated installation, and generally lower costs. Another advantage is that only one radio license is required for the transmitter/receiver.

According to a first embodiment of the present invention, a control apparatus is connected with a transmitting/receiving system (transmitter and receiver with antennas). Changing over from one motor vehicle function to another requires only that there is a change as to which of the received signals is evaluated. When the presence of a correct identity transmitter is required to perform a function, such as the access control system and/or the immobilizer system, the control apparatus checks the correctness of the response signal, which can be coded, that is received from the identity transmitter. On the other hand, in the case of an interior space surveillance monitoring or collision avoidance radar, the control apparatus evaluates a physical magnitude of the received signal, such as significant field strength changes or phase changes (in the case of an interior space surveillance monitor) or the signal transit time (in the case of a collision avoidance system or a parking aid), without checking for the presence of a response signal from the identity transmitter. In this case the control apparatus can always send, through the transmitting/receiving system, the same, regularly coded inquiry signal, so that no switching of the transmission signal is necessary. This is advantageous especially when the particular motor vehicle functions cannot be operated simultaneously (for example, a parking aid and either the access control system or immobilizer system).

According to a second embodiment of the present invention, the control apparatus switches the signal to be transmitted according to whether or not a check of the identity transmitter is necessary. In the first embodiment, a usually coded inquiry signal is transmitted, to which the identity transmitter responds with its coded response signal. In the second embodiment, an uncoded or at least differently coded inquiry signal is transmitted for the additional motor vehicle function, such as the interior space surveillance monitor, the collision avoidance radar, or the parking aid. In this manner the problem of an unnecessary response of the identity transmitter or of an unauthorized detection of the inquiry signal is reduced, since it is transmitted only during the short identity transmitter authorization checking phases.

The control apparatus can use the same transmitting and receiving frequency, both for checking the authorization of the identity transmitter (inquiry and response signal frequency), as well as for performing the additional motor vehicle function, such as the internal space surveillance monitor or the parking aid. Thus, the transmitter and receiver can be designed for only a single frequency, thus reducing the cost of construction and lowering the demands on the components involved. Alternatively, it is also possible to provide different frequencies or frequency bands for the different motor vehicle functions, so that the danger of triggering a function that is not actually desired is still further reduced.

The invention will be further explained below with the aid of an example, which is shown in the FIGURE, directed to an immobilizer and an interior surveillance monitor.

On or in the motor vehicle there is provided a triggering means 1, which in the case of an immobilizer system can be a motor starter button. The triggering means 1 is connected with a control apparatus 2, which operates a transmitter/receiver system 3 to emit signals and evaluates the signals received by the transmitter/receiver system 3. The transmitter/receiver system 3 includes a transmitter and a receiver, as well as the corresponding antennas, and converts the signals fed from the control apparatus to high-frequency modulated transmit signals. Received high-frequency signals are converted by the transmitter/receiver system 3 to demodulated, low-frequency signals that can be evaluated by the control apparatus, and converted and applied by the control apparatus 2. Actuating the triggering means 1 causes the control apparatus 2 to operate the transmitter/receiver system 3 to emit a coded inquiry signal 4 to an identity transceiver 5, which responds to this inquiry signal and emits a coded response signal 6. The control apparatus 2 checks the received response signal 6 for correctness by comparing it with an internal code and, if the response signal is correct, releases the immobilizer so that the motor can be started. The identity transceiver 5 can be in the form of a key with an additional transmitting and receiving function or it can be a chip card (i.e., smart-card) or can be in any other known form, and it is issued only to persons authorized to use it. If the identity transmitter 5 is configured as a key which can be inserted into the starter lock, the triggering means 1 can also be in the form of a switch or sensor disposed in the keyhole channel. The transmitter/receiver system 3 and the identity transceiver 5 preferably transmit on the same frequency, for example in the radar range at approximately 2.4 GHz.

The control apparatus is designed such that, through the transmitter/receiver system 3, it is able to perform still another motor vehicle function, such as an interior surveillance monitor. This interior space surveillance monitor is preferably active only as an anti-theft device when the car is turned off and locked, i.e., it is not activated at the same time as the immobilizer system. For interior surveillance, the control apparatus 2 operates the transmitter/receiver system 3 to emit uncoded signals 7 at regular or irregular time intervals, which have the same frequency as the coded inquiry signal 4. In the case of interior surveillance, the transmitter/receiver system 3, or at least its antenna(s), are located in the vehicle's interior. Thus, reflected signals 8 produced by the components of the interior are received and are compared with reference patterns. In the undisturbed state the reflected signals 8 have a certain pattern, e.g., a relatively constant amplitude and phasing. If anyone breaks into the car interior or car windows are broken, however, this pattern definitely changes. This pattern change is detected by the control apparatus 2 and evaluated as an attempted break-in, so that an acoustical and/or optical alarm signal can be generated. Thus, the control apparatus 2 performs a different signal evaluation during interior surveillance than in the case of an identity transmitter check. This different evaluation, and also the different transmission signal generation, is started, for example, when the control apparatus 2 detects (or receives a signal) that the vehicle has been locked, and is deactivated again when the vehicle is opened. On the other hand, the operation of the immobilizer system is started when the triggering means 1 is operated, and ends when the motor is started or the absence of a correct identity transceiver 5 is detected.

The control apparatus 2 can also use the transmitter/receiver system 3 of the interior surveillance monitor for the access control system, either alternatively or in addition to the immobilizer. In this case the triggering means 1 is an element that can be operated from the outside, as for example the door handle or a door button. The interior monitor in this case has antennas radiating outwardly into the outer range of the driver or passenger door; these can be disposed, for example, in the side view mirrors and be energized by the transmitter/receiver system 3 only when the access control system triggering means 1 is operated. The control apparatus 2 then switches the transmitter/receiver system 3 to emitting the coded inquiry signal 4 and evaluates the coded response signal of the identity transceiver 5 that is received through its antennas in the same manner as in the case of the immobilizer system operation. If the response signal is correct, the door opening mechanism is activated so that the vehicle is then accessible.

Alternatively, a motor vehicle function involving signal transmission and reception in the area outside of the motor vehicle, as for example a collision avoidance radar or a parking aid, can be used with the access control system. When the triggering means 1 of the access control system is operated, the transmitter/receiver system 3 of the parking aid is activated to emit the coded inquiry signal 4 and the coded response signal received from the identity transmitter 5 is passed through the transmitter/receiver system 3 to the control apparatus 2 for checking. The process explained above with regard to the interior space monitor applies similarly here to the transmitter/receiver system 3 of the collision avoidance radar which transmits on the same frequency as the identity transceiver 5. If the identity transceiver 5 sends a wrong response signal or, due to a wrong inquiry signal 4, no response signal is received at all, the door locks remain locked.

If, while the car is being driven, the collision avoidance radar or the parking aid is activated, for example by engaging the reverse gear, the control apparatus 2 operates the transmitter/receiver system 3 to emit uncoded signals 7 and evaluates the received reflected signals 8, e.g., by transit time measurement, for the determination of distance.

The invention can be used also for other motor vehicle functions permitted only when a correct identity transceiver is present, and for other motor vehicle functions operated while the car is being driven or standing, in which case the transmitter/receiver system 3 of the first function is used also to perform the second function, while the control apparatus 2 switches between the signals to be emitted or the signals received for evaluation, depending on their function.

In the embodiment shown in the drawing, the control apparatus 2 that controls at least two motor vehicle functions is represented as a single component. The control apparatus 2, however, can also be formed by two or more separate control apparatus which selectively control the motor vehicle functions associated with each (interior space surveillance, immobilizer, or the like) and also generate the corresponding transmission signals as well as evaluate the response signals received. In this case the control apparatus are connected in common to the transmitter/receiver system 3 used in common by them, such that they do not interfere with one another in their operation, if ever they operate at all simultaneously.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A system for controlling plural functions of a vehicle, the system comprising:
    an electromagnetic transceiver adapted to be fixed with respect to the vehicle, the electromagnetic transceiver receiving a coded response signal, transmitting an uncoded outgoing signal, and receiving an uncoded incoming signal that is a reflection of the uncoded outgoing signal; and
    a controller operatively interconnected with the electromagnetic transceiver, the controller verifying the coded response signal to authorize a first vehicle function and evaluating the uncoded incoming signal in connection with a second vehicle function.

2. The system according to claim 1, further comprising:
    an electromagnetic communication device adapted to be portable with respect to the vehicle, the electromagnetic communication device transmitting the coded response signal.

3. The system according to claim 2, wherein the electromagnetic communication device is disposed in one of a key and a card.

4. The system according to claim 2, wherein the electromagnetic transceiver transmits an inquiry signal and the electromagnetic communication device transmits the coded response signal in response to receiving the inquiry signal.

5. The system according to claim 4, wherein the inquiry signal is coded.

6. The system according to claim 4, further comprising:
    a trigger device operatively interconnected with the electromagnetic transceiver, the trigger device activating the electromagnetic transceiver to transmit the inquiry signal.

7. The system according to claim 6, wherein the controller operatively interconnects the trigger device to the electromagnetic transceiver.

8. The system according to claim 6, wherein the trigger device is adapted to be fixed with respect to the vehicle.

9. The system according to claim 1, wherein the second vehicle function includes a plurality of functions, and the electromagnetic transceiver transmits a different uncoded outgoing signal corresponding to each of the plurality of functions.

10. The system according to claim 9, wherein each of the uncoded outgoing signals are at substantially the same frequency.

11. The system according to claim 1, wherein the second vehicle function comprises at least one of interior surveillance, vehicle immobilization, vehicle access control, collision avoidance, and parking assistance.

12. A system for controlling functions of a vehicle, the system comprising:
    a first electromagnetic communication device transmitting a response signal; and
    a second electromagnetic communication device receiving the response signal, transmitting an outgoing signal, and receiving an incoming signal that is a reflection of the outgoing signal.

13. The system according to claim 12, wherein the second electromagnetic communication device transmits an inquiry signal, and the first electromagnetic communication device transmits the response signal in reply to the inquiry signal.

14. The system according to claim 12, further comprising:
    a trigger device operatively interconnected with the second electromagnetic communication device and activating the inquiry signal.

15. A method for controlling functions of a vehicle, the method comprising:
    receiving a coded response signal;
    verifying the coded response signal to authorize a first vehicle function;
    transmitting an uncoded outgoing signal;
    receiving an uncoded incoming signal that is a reflection of the uncoded outgoing signal; and
    evaluating the uncoded incoming signal in connection with a second vehicle function.

16. The method according to claim 15, further comprising:
    providing an electromagnetic transceiver receiving the coded response signal, transmitting the uncoded outgoing signal, and receiving the uncoded incoming signal.

17. The method according to claim 15, further comprising:
    providing a controller verifying the coded response signal, authorizing the first vehicle function, and evaluating the uncoded incoming signal.

18. The method according to claim 15, further comprising:
    transmiting an inquiry signal provoking the coded response signal.

19. The method according to claim 15, wherein the transmitting the uncoded outgoing signal includes transmitting a plurality of uncoded outgoing signals, and the receiving the uncoded incoming signal includes receiving respective reflections of corresponding ones of the plurality of uncoded outgoing signals.

20. The method according to claim 19, wherein the evaluating the uncoded incoming signal in connection with the second vehicle function includes evaluating the respective reflections in connection with a corresponding vehicle function.

* * * * *